(12) United States Patent
Kotlarski

(10) Patent No.: US 6,202,251 B1
(45) Date of Patent: Mar. 20, 2001

(54) WIPER BLADE

(75) Inventor: Thomas Kotlarski, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/202,651

(22) PCT Filed: Mar. 24, 1998

(86) PCT No.: PCT/DE98/00859

§ 371 Date: Dec. 18, 1998

§ 102(e) Date: Dec. 18, 1998

(87) PCT Pub. No.: WO98/51551

PCT Pub. Date: Nov. 19, 1998

(30) Foreign Application Priority Data

May 9, 1997 (DE) .......................................... 297 08 293 U

(51) Int. Cl.[7] ...................................................... B60S 1/40
(52) U.S. Cl. ...................................... 15/250.32; 15/250.43
(58) Field of Search ............................ 15/250.32, 250.43, 15/250.361, 250.451, 250.44

(56) References Cited

U.S. PATENT DOCUMENTS 2,303,694 * 12/1942 Horton ............................. 15/250.451
2,761,168 * 9/1956 Krohm ............................... 15/250.32
2,932,843 * 4/1960 Zaiger et al. ....................... 15/250.32
3,132,367 * 5/1964 Wise .................................. 15/250.32
3,390,416 * 7/1968 Scinta ................................ 15/250.32

FOREIGN PATENT DOCUMENTS

| 1077088 | * 3/1960 | (DE) . | |
| 1 247 161 | 8/1967 | (DE) . | |
| 26 14 457 | 10/1976 | (DE) . | |
| 2743086 | * 3/1978 | (DE) | ................. 15/250.32 |
| 2843164 | * 4/1979 | (DE) | ................ 15/250.451 |
| 1069875 | * 7/1954 | (FR) . | |

* cited by examiner

*Primary Examiner*—Gary K. Graham
(74) *Attorney, Agent, or Firm*—Michael J. Striker

(57) ABSTRACT

A wiper blade (10) for cleaning windows (26) of motor vehicles has an elongated, rubber-elastic wiper strip (14), which can be pressed against the window (26) to be wiped and is held substantially parallel to the longitudinal axis on an elongated, spring-elastic support element (12), to whose middle portion, remote from the window (26), a connection device (16) for counterpart connection means of a driven wiper arm, which means can be loaded toward the window (26), are disposed. Problem-free, economical disposition of the connection device (16) on the support element (12) is obtained if the connection device (16) is embodied as a separate component and secured to the support element (12) by means of an adhesive.

9 Claims, 2 Drawing Sheets

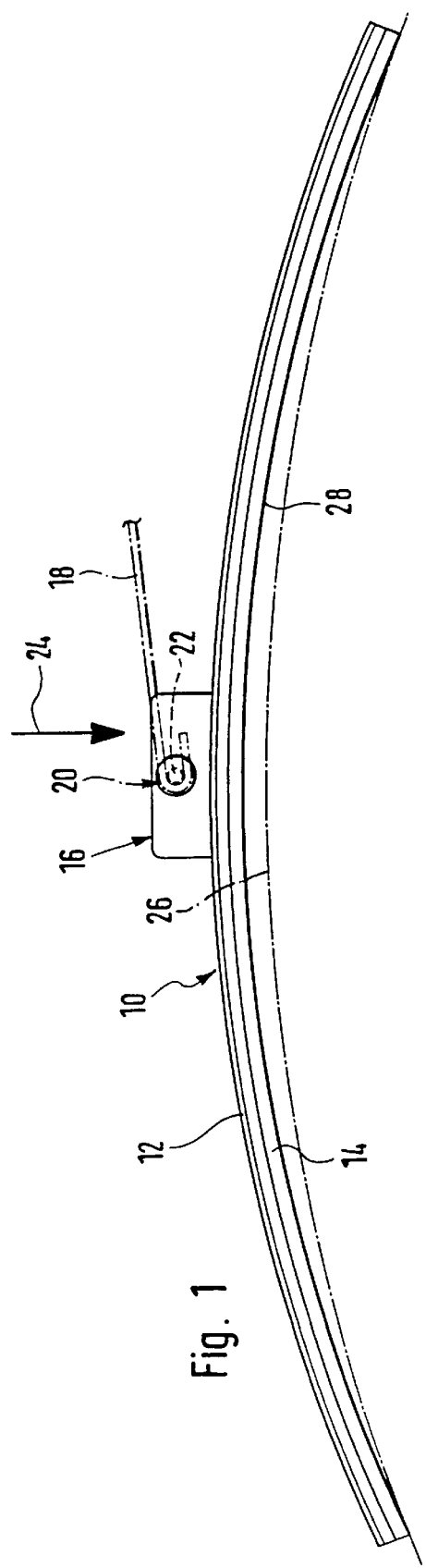
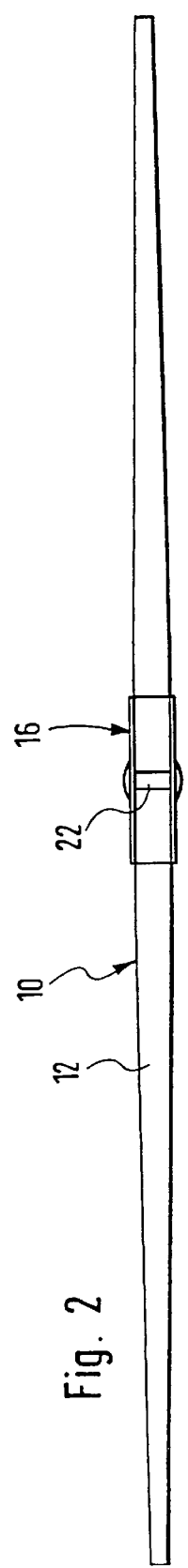

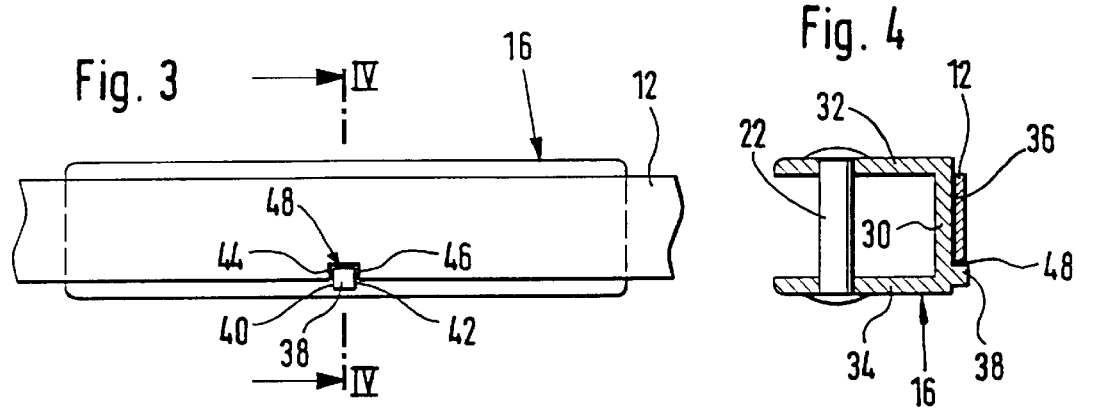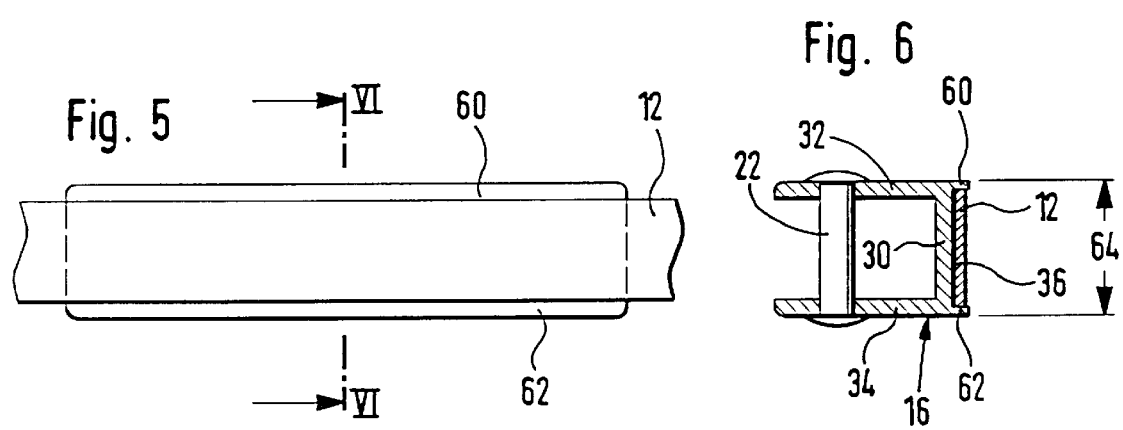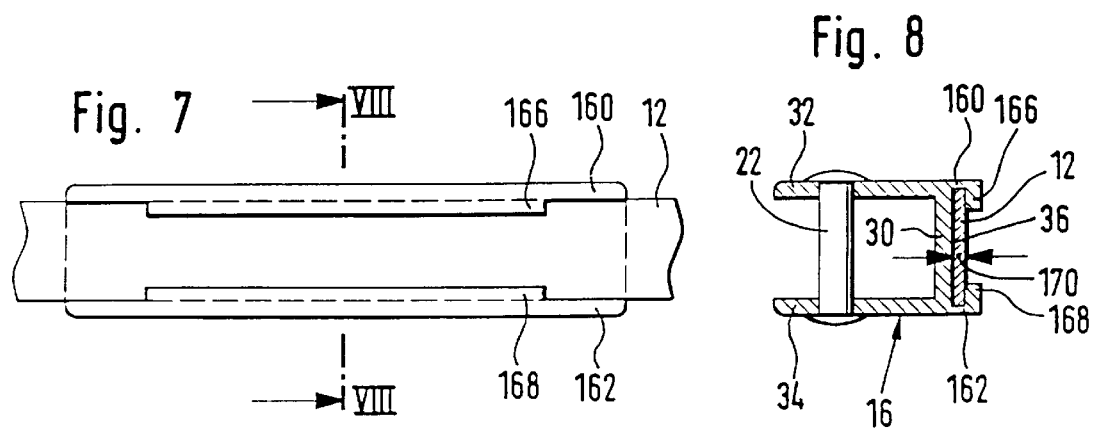

WIPER BLADE

BACKGROUND OF THE INVENTION

In wiper blades, the support element for the entire field swept by the wiper blade is intended to assure the most uniform possible distribution of the wiper blade contact pressure, originating in the wiper arm, against the window. By means of suitable curvature of the unloaded support element—that is, when the wiper blade is not resting on the window—the ends of the wiper strip, which in wiper blade operation is pressed completely against the window, are located by the then tensed support element toward the window, even if the radii of curvature of spherically curved vehicle windows change in every wiper blade position. That is, the curvature of the wiper blade must be somewhat greater than the greatest curvature measured in the wiping field of the window to be wiped. The support element thus replaces the complicated support bracket construction with two support elements disposed in the wiper strip of the kind used in conventional wiper blades.

The invention takes as its point of departure a known wiper blade (German Patent Disclosure DE 26 14 457), in which the connection device is integrally joined to the support element. Hence it is made of the same material as the support element. This may possibly be of secondary importance as long as the support element is made from a plastic which is therefore made by filling a suitable mold. However, if the support element is to be made of metal, then two demands directly contradict one another. On the one hand, the support element should have good spring properties, but on the other the attachments of the connection device should be easily bent by approximately 90° out of the plane of the support element and fixed in that position, so that the loads occurring in operation between the wiper blade and the wiper arm can be absorbed on stop faces of these attachments. These two demands are virtually impossible to meet unless disadvantageous compromises in the choice of material are made.

In another known wiper blade (German Published, Examined Patent Disclosure DE-AS 12 47 161), the support element is provided with a connection device as a separate component. This connection device is solidly joined to the support element with the aid of rivets. The requisite bores in the support element, however, lead to an undesired, because uncontrollable, change in the support element tension, so that a satisfactory window wiping result cannot be attained.

SUMMARY OF THE INVENTION

In accordance with the present invention, the connection device is formed as a separate component and is secured to the support element by means of an adhesive.

In the wiper blade in accordance with the present invention with the body, a choice of materials that suits the demands made of the particular component can be made for both the support element and the connection device. The joining of the two components to one another is done easily and economically by means of an adhesive, so that undesired changes in the cross section of the support element are avoided.

A connection device that can be adapted without difficulty in view of the wiper arm design is obtained if it has a substantially U-shaped cross section and rests flatly with the base of the U, joining the two legs of the U, on the side of the bandlike support element remote from the window.

As an aid in assembly, the base of the U of the connection device may be provided, on its side remote from its legs of the U, with protrusions, which are spaced apart crosswise to the longitudinal extent of the support element by a distance that is adapted to the width of the support element.

Especially good lateral guidance and holding of the two components to be joined together is attained if the protrusions are embodied as strips, which extend longitudinally of the support element.

A further-improved, stable holding of the connection device to the support element is attained if on the free ends of the strips, remote from the base of the U, clawlike attachments oriented counter to one another are disposed, and the spacing between the clawlike attachments and the outside, remote from the legs of the base of the U is adapted to the thickness of the support element.

For positioning the connection device on the support element in the longitudinal direction thereof, the connection device has at least one shoulder, pointing longitudinally of the support element, with which shoulder a counterpart shoulder of the support element is associated. The result is accordingly a positive positioning aid that becomes operative before the adhesive bonding operation.

Absolute securing of the mounted position of the connection device on the support element is obtained if the connection device has at least two shoulders, pointing in opposite directions, with each of which the counterpart shoulder of the support element is associated.

Further advantageous features and refinements of the invention are described in the ensuing description of embodiments shown in the drawing.

BRIEF DESCRIPTION OF THE DRAWING

Shown in the drawing are:

FIG. 1, a side view of a wiper blade according to the invention;

FIG. 2, a plan view on the wiper blade of FIG. 1;

FIG. 3, a view from below, on a larger scale, of a support element that is part of the wiper blade and is provided with a first embodiment of the connection device;

FIG. 4, a section taken along the line IV—IV through the arrangement of FIG. 3;

FIG. 5, a view from below, on a larger scale, of a support element that is part of the wiper blade and is provided with a second embodiment of the connection device;

FIG. 6, a section taken along the line VI—VI through the arrangement of FIG. 5;

FIG. 7, a view from below, on a larger scale, of a support element that is part of the wiper blade and is provided with a third embodiment of the connection device; and FIG. 8, a section taken along the line VIII—VIII through the arrangement of FIG. 7.

DESCRIPTION OF PREFERRED EMBODIMENTS

A wiper blade 10 shown in FIGS. 1 and 2 has an elongated, spring-elastic support element 12, to the underside of which an elongated, rubber-elastic wiper strip 14 is secured parallel to the longitudinal axis. A connection device 16, with the aid of which the wiper blade can be detachably joined to a driven wiper arm 18, is disposed on the support element, which can also be called a spring rail, in the middle portion thereof. A hook acting as a counterpart connection means is formed on the free end 20 of the wiper arm 18 and clasps a pivot pin 22 that belongs to the connection device 16 of the wiper blade. The securing between the wiper arm 18 and the wiper blade 10 is performed by securing means known per se and not shown in further detail, which are embodied as an adapter. The wiper arm 18 and thus also the hook on its end 20 are loaded in the direction of the arrow 24 toward the window to be wiped, whose surface to be wiped is represented in FIG. 1 by a dot-dashed line 26. Since the dot-dashed line 26 is intended to represent the greatest curvature of the window surface, it is clearly apparent that the curvature of the wiper blade, resting with both its ends on the window, is greater than the maximum window curvature. The wiper blade presses with the contact pressure (arrow 24) presses over its entire length with its wiper lip 28 against the window surface 26. In the process, a tensing builds up in the spring-elastic support element 12 that assures proper contact of the wiper strip 14, or its wiper lip 28, over its entire length on the window.

The connection between the support element 12 and the connection device 16 will now be explained in further detail in terms of FIGS. 3 and 4; 5 and 6; and 7 and 8. In the first embodiment of the invention, shown in FIGS. 3 and 4, the connection device 16, of substantially U-shaped cross section, is pressed flatly, with the outside of its base 30 of the U, against the surface, remote from the window to be wiped, of the bandlike support element 12. The legs 32 and 34 of the U of the connection device 16 extend on the side of the base 30 of the U remote from the support element 12. The pivot pin 22 is supported in the legs 32 and 34 of the U. The fastening of the connection device 16 to the support element 12 is done with the aid of an adhesive, which is present between the facing surfaces of the base 30 of the U of the connection device 16 and the surface, oriented toward it, of the support element 12. This adhesive face is identified by reference numeral 36 in FIG. 4.

As a positioning aid, the base 30 of the U of the connection device has a protrusion 38, extending from the side remote from the legs 32 and 34 of the U, and this protrusion has two shoulders 40 and 42 pointing in opposite directions—as viewed in the longitudinal direction of the support element 12. These shoulders 40 and 42 are each assigned a respective counterpart shoulder 44 and 46 of the support element, and the counterpart shoulders are embodied at a recess 48 of the support element 12. Because these shoulders point in the longitudinal direction of the support element, a positive connection is obtained between the support element 12 and the connection device 16 longitudinally of the support element. This positive engagement acts as a positioning aid when the welded connection is to be made.

In the exemplary embodiment of FIGS. 5 and 6—which shows a refinement of the arrangement of FIGS. 3 and 4—two striplike protrusions 60 and 62 are disposed, spaced apart from one another by a distance adapted to the width 64 of the support element 12, on the side of the base 30 of the U remote from the legs 32 and 34 of the U. The striplike protrusions 60 and 62 extending longitudinally of the support element 12 form lateral guides, which secure the position of the connection device 16 on the support element 12 crosswise to its longitudinal extent.

The embodiment of FIGS. 7 and 8 is based on the embodiment of FIGS. 5 and 6. In a departure from that embodiment, for further simplification of preassembly, the striplike protrusions 160 and 162 are provided, on their free ends remote from the base 30 of the U, with clawlike attachments 166 and 168 pointing in opposite directions from one another. The spacing between the outside of the base 30 of the U, remote from the legs 32, 34 of the U, and the side oriented toward the base of the attachments 166 and 168 is adapted to the thickness 170 of the support element 12. This adaptation is made such that just as in the embodiment of FIGS. 5 and 6, an easy but largely play-free relative motion between the two components 12 and 16 is possible.

In the two embodiments of FIGS. 5 and 6 as well as FIGS. 7 and 8, the fastening of the connection device 16 to the support element is accomplished—as described for the embodiment of FIGS. 3 and 4—with an adhesive, which is introduced as a layer 36, between the facing surfaces of the bandlike support element 12 and the base of the U 30 of the connection device 16.

The adhesive bond between the support element 12 and the connection device 16 can be employed at any time. It does not matter whether the spring strip 12 comprises a plastic or an elastic metal, to which the plastic or metal connection device 16 is to be fastened. It should also be noted that the positive connection described in the embodiment of FIGS. 3 and 4—that is, the protrusion 38 with its shoulders 40 and 42 and the recess 48 with its counterpart shoulders 44 and 46—can also be used in the embodiments of FIGS. 5 and 6 and FIGS. 7 and 8. It is also noted that the bandlike support element 12 in the exemplary embodiments is indeed made in one part, but it can also comprise multiple parts without thereby departing from the scope of the present invention.

It is clear that—in a departure from the exemplary embodiment shown—the counterpart shoulders 44, 46 need not necessarily be embodied on a recess 46, open at the edge, of the support element. In view of the operating tension present in the support element 12 and oriented toward the window, it may be advantageous to dispose the counterpart shoulders in a region of the support element that is invulnerable in this respect. This can be done for instance in a region of the support element facing the central region of the base of the U; the counterpart shoulders are embodied on an opening that is closed all the way around. Accordingly, the shoulders cooperating with them should then be placed on the connection device 16.

It should also be remembered that the arrangement of the positioning aid described can be employed independently of whatever way in which the connection device is to be joined to the support element.

What is claimed is:

1. A wiper blade (10) for motor vehicle windows, having an elongated, rubber elastic wiper strip (14), which can be pressed against the window (26) to be wiped and is held substantially parallel to the longitudinal axis of an elongated spring elastic band-shaped support element (12), to whose middle portion, on the side remote from the window, a connection device (16) for a driven wiper arm, loadable toward the window, is secured, and the connection device (16) is embodied as a separate component, said support element (12) being flat and having two parallel sides including one side to which the wiper strip (14) is directly fixed In continuous contact therewith along its entire length and the other side to which the connection device (16) for the wiper blade is directly fixed, and the connection device (16) has at least one flat side with which it comes into direct contact to the flat side of the support element (12) and is secured to the flat side of the support element by an adhesive.

2. The wiper blade of claim 1, wherein the connection device (16) has a substantially U-shaped cross section and rests with the base (30) of the U, joining its two legs (32, 34) of the U, flatly on the side, remote from the window, of the band-shaped support element (12).

3. The wiper blade of claim 2, wherein the base (30) of the U of the connection device (16) is provided, on its side remote from the legs (32, 34) of the U, with protrusions (60, 62), which are spaced apart from one another crosswise to the longitudinal extent of the support element (12) by a distance (64) which is adapted to the width of the support element.

4. The wiper blade of claim 3, wherein the protrusions (60, 62) are embodied as strips, which extend longitudinally of the support element (12).

5. The wiper blade of claim 2, wherein at least one shoulder (40 or 42), pointing in the longitudinal direction of the support element (12), is disposed on the connection device (16) and a counterpart shoulder (44 or 46) of the support element (12) is associated with it.

6. The wiper blade of claim 5, wherein the connection device (16) is provided at least two shoulders (40 and 42), pointing in opposite directions, with each of which a counterpart shoulder (44 and 46) of the support element (12) is associated.

7. The wiper blade of claim 6, wherein the shoulders (40 and 42) of the connection device (16) are embodied on a protrusion (38) of the connection device (16), and the counterpart shoulders (44) and (46) are embodied on a recess (48), associated with the protrusion (38) of the support element (12).

8. A wiper blade (10) for motor vehicle windows, having an elongated, rubber elastic wiper strip (14), which can be pressed against the window (26) to be wiped and is held substantially parallel to the longitudinal axis of an elongated, spring-elastic band-shaped support element (12), to whose middle portion, on the side remote from the window, an elongated connection device (16) for a driven wiper arm, loadable toward the window, is secured, and the connection device (16) is embodied as a separate component and is secured to the support element (12) by means of an adhesive, the connection device 16 has a substantially U-shaped transverse cross-section and rests with the base 30 of the U, joining its two legs (32, 34) of the U flatly on the side, remote from the window, of the band-shaped support element 12, the base (30) of the U of the connection device (16) is provided, on its side remote from the legs (32, 34) of the U, with protrusions (60, 62), which are spaced apart from one another crosswise to the longitudinal extent of the support element (12) by a distance (64) which is adapted to the width of the support element, the protrusions (60, 62) are embodied as strips, which extend longitudinally of the support element (12) on the free ends of the strips (160, 162), remote from the base (30) of the U, clawlike attachments (166, 168) oriented counter to one another are disposed, and that the spacing between the clawlike attachments (166, 168) and the outside, remote from the legs (32, 34) of the base (30) of the U is adapted to the thickness (170) of the support element (12).

9. A wiper blade (10) for motor vehicle windows, having an elongated, rubber elastic wiper strip (14), which can be pressed against the window (26) to be wiped and is held substantially parallel to the longitudinal axis of an elongated spring elastic band-shaped support element (12), to whose middle portion, on the side remote from the window, a connection device (16) for a driven wiper arm, loadable toward the window, is secured, and the connection device (16) is embodied as a separate component, said support element (12) being flat and having two parallel sides including one side to which the wiper strip (14) is directly fixed in continuous contact therewith along its entire length and the other side to which the connection device (16) for the wiper blade is directly fixed, and the connection device (16) has at least one flat side with which it comes into direct contact to the flat side of the support element (12) and secured to the flat side of the support element by an adhesive, the connection device (16) has a substantially U-shaped transverse cross section and rests with a base (30) of the U, joining its two legs (32, 34) of the U, flatly on the side, remote from the window, of the band-shaped support element (12), shoulders (40,42) of the connection device (16) are embodied on a protrusion (38) of the connection device (16), and counterpart shoulders (40,46) are embodied on a recess (48) associated with the protrusion (38) of the support element (12).

* * * * *